(12) United States Patent
Bansal et al.

(10) Patent No.: US 8,948,044 B2
(45) Date of Patent: Feb. 3, 2015

(54) WEIGHTED-FAIRNESS IN MESSAGE RATE BASED CONGESTION CONTROL FOR VEHICULAR SYSTEMS

(71) Applicant: Toyota Jidosha Kabushiki Kaisha, Toyota-shi, Aichi-ken (JP)

(72) Inventors: Gaurav Bansal, San Jose, CA (US); John Kenney, Santa Clara, CA (US)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 183 days.

(21) Appl. No.: 13/664,308

(22) Filed: Oct. 30, 2012

(65) Prior Publication Data

US 2014/0119210 A1 May 1, 2014

(51) Int. Cl.
 *H04L 12/28* (2006.01)
 *H04W 28/02* (2009.01)
 *H04L 12/825* (2013.01)

(52) U.S. Cl.
 CPC ........... *H04W 28/021* (2013.01); *H04L 47/263* (2013.01)
 USPC ........................................................ 370/253

(58) Field of Classification Search
 None
 See application file for complete search history.

(56) References Cited

U.S. PATENT DOCUMENTS

| | | | | |
|---|---|---|---|---|
| 7,835,351 B2* | 11/2010 | Mosko et al. | .................. | 370/389 |
| 7,849,149 B2* | 12/2010 | Habaguchi et al. | ........... | 709/207 |
| 2005/0141463 A1* | 6/2005 | Ando | .............................. | 370/335 |
| 2006/0250960 A1* | 11/2006 | Ando | .............................. | 370/233 |
| 2006/0280205 A1* | 12/2006 | Cho | ................................. | 370/473 |
| 2007/0174467 A1* | 7/2007 | Ballou et al. | .................. | 709/227 |
| 2008/0112476 A1* | 5/2008 | Vong et al. | ..................... | 375/224 |
| 2009/0081958 A1* | 3/2009 | McNew et al. | ................. | 455/69 |
| 2009/0086802 A1* | 4/2009 | Nabetani | ....................... | 375/225 |
| 2010/0165846 A1* | 7/2010 | Yamaguchi et al. | ........... | 370/236 |
| 2010/0195561 A1* | 8/2010 | Yamaguchi et al. | ........... | 370/315 |
| 2011/0038273 A1* | 2/2011 | Li et al. | .......................... | 370/252 |
| 2011/0051677 A1* | 3/2011 | Jetcheva et al. | ............... | 370/329 |
| 2011/0194568 A1* | 8/2011 | Ozawa | ........................... | 370/465 |
| 2012/0022741 A1* | 1/2012 | Moore et al. | ..................... | 701/33 |
| 2012/0320759 A1* | 12/2012 | Shao et al. | ..................... | 370/242 |

FOREIGN PATENT DOCUMENTS

JP 2009231857 10/2009

* cited by examiner

*Primary Examiner* — Anh-Vu Ly
(74) *Attorney, Agent, or Firm* — Patent Law Works LLP

(57) ABSTRACT

A system and method for implementing congestion control for vehicles based at least in part on weighted fair message rates is disclosed. The system comprises a measurement module, a calculation module and a determination module. The measurement module measures a channel busy ratio describing a fraction of time during which a channel is busy. The calculation module calculates a ratio error by comparing the measured channel busy ratio with a target channel busy ratio. The determination module determines a first parameter value for a first vehicle based at least in part on a ratio of weights and determines a message rate for the first vehicle based at least in part on the ratio error and the first parameter value. The message rate describes a speed for transmitting messages from the first vehicle.

17 Claims, 8 Drawing Sheets

WEIGHTED-FAIRNESS IN MESSAGE RATE BASED CONGESTION CONTROL FOR VEHICULAR SYSTEMS

BACKGROUND

The specification relates to vehicular communication systems. In particular, the specification relates to a system and method for synchronously updating message rates to control communication congestion, where the message rates converge to weighted fair rates for different vehicles in a distributed manner.

Vehicles usually communicate with each other using Dedicated Short Range Communications ("DSRC") channels specially designed for automotive use. It has been well known that congestion mitigation on the DSRC channels is one of the priorities in moving DSRC towards deployment. Existing message rate based congestion control strategies converge all the vehicles participating in congestion control to the same steady state message rates. In some scenarios, different steady message rates for different vehicles are desired. For example, ambulances and police cars engaged in emergency services travel at a much higher speed than private vehicles, and can be more prone to accidents. Therefore, practically it may be desirable that such vehicles transmit messages at a higher rate than the rates used by private vehicles. However, the existing message rate based congestion control strategies cannot achieve different steady message rates for different vehicles.

SUMMARY OF THE INVENTION

The specification overcomes the deficiencies and limitations of the prior art at least in part by providing a system and method for implementing congestion control for vehicles based at least in part on weighted fair message rates where the weighted fair message rates are calculated in a distributed manner. The system comprises a measurement module, a calculation module and a determination module. The measurement module measures a channel busy ratio describing a fraction of time during which a channel is busy. The calculation module calculates a ratio error by comparing the measured channel busy ratio with a target channel busy ratio. The determination module determines a first parameter value for a first vehicle based at least in part on a ratio of weights. The determination module determines a message rate for the first vehicle based at least in part on the ratio error and the first parameter value. The message rate describes a speed for transmitting messages from the first vehicle.

In one embodiment, the determination module determines the message rate for the first vehicle recursively so that the message rate for the first vehicle converges to a steady state message rate based at least in part on the ratio of weights.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
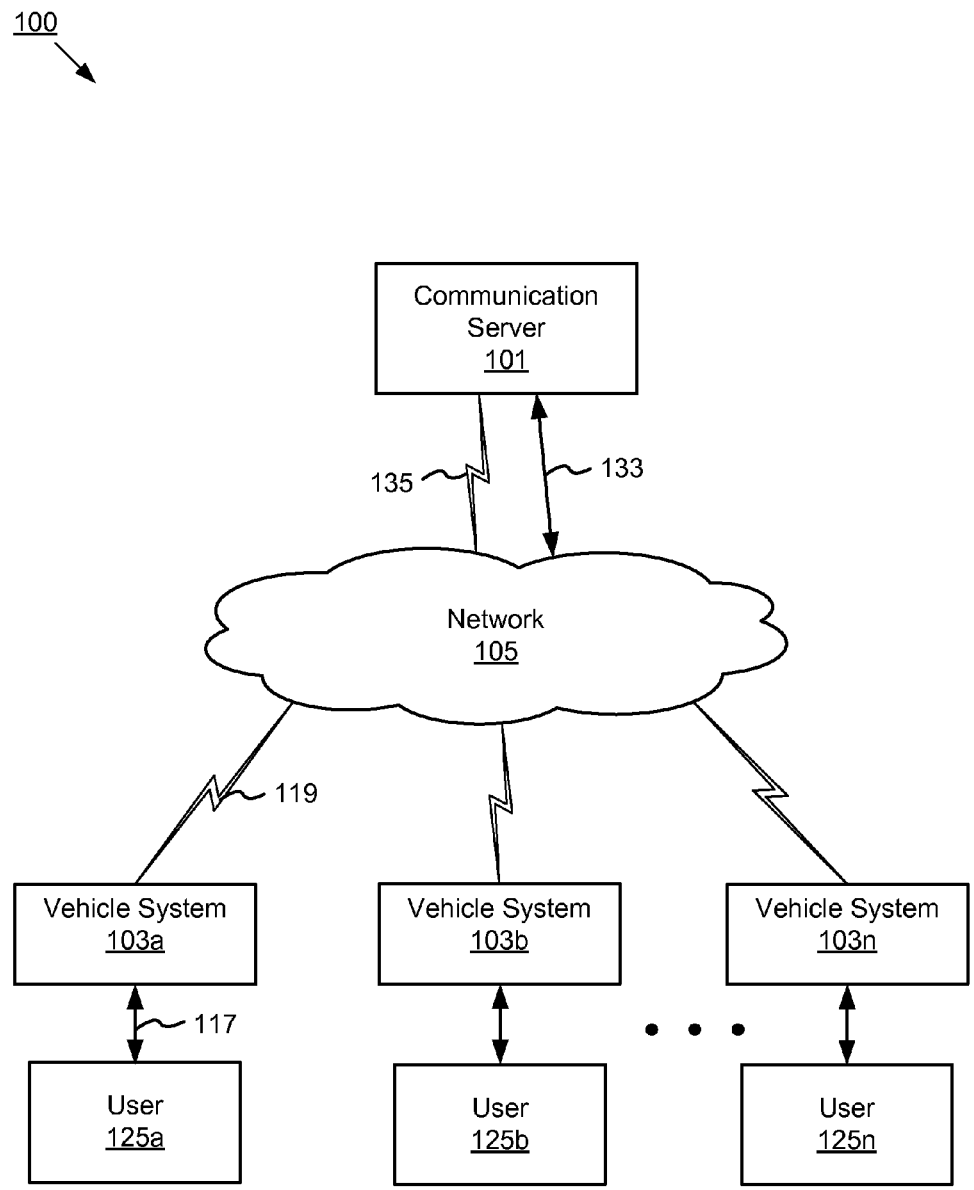
FIG. 1 is a high-level block diagram illustrating a system for implementing congestion control for vehicles based at least in part on weighted fair message rates according to one embodiment.

A system and method for implementing congestion control for vehicles based at least in part on weighted fair message rates is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for implementing congestion control for vehicles based at least in part on weighted fair message rates according to one embodiment. The illustrated system 100 includes vehicle systems 103a, 103b, 103n (referred to individually or collectively as communication systems 103) that are accessed by users 125a, 125b, 125n (also referred to collectively or individually as users 125), and a communication server 101. In the illustrated embodiment, the vehicle systems 103 and the communication server 101 are communicatively coupled via a network 105. For example, the vehicle systems 103 and the communication server 101 are communicatively coupled to one another via the network 105 to facilitate the communication server 101 to transmit information to the vehicle systems 103. In another example, the vehicle systems 103 are communicatively coupled to one another via the network 105 to facilitate the transmitting and receiving of information between each other.

Although three vehicle systems 103a, 103b, 103n and one communication server 101 are illustrated in FIG. 1, persons having ordinary skill in the art will recognize that any number of vehicle systems 103 and communication server 101 can be communicatively coupled to the network 105. Furthermore, while only one network 105 is coupled to the vehicle system 103 and the communication server 101, persons having ordinary skill in the art will appreciate that any number of networks 105 can be connected to the vehicle system 103 and the communication server 101.

The network 105 is a conventional type, wired or wireless, and may have any number of configurations such as a star configuration, token ring configuration or other configurations known to those skilled in the art. Furthermore, the network 105 may comprise a local area network ("LAN"), a wide area network ("WAN") (e.g., the Internet), and/or any other interconnected data path across which multiple devices may communicate. In yet another embodiment, the network 105 may be a peer-to-peer network. The network 105 may also be coupled to or include portions of a telecommunications network for sending data in a variety of different communication protocols. For example, the network 105 is a 3G network or a 4G network. In another embodiment, the network 105 includes Bluetooth communication networks or a cellular communications network for sending and receiving data such as via short messaging service ("SMS"), multimedia messaging service ("MMS"), hypertext transfer protocol ("HTTP"), direct data connection, WAP, e-mail, etc. In yet another embodiment, all or some of the links in the network 105 are encrypted using conventional encryption technologies such as secure sockets layer ("SSL"), secure HTTP and/or virtual private networks ("VPNs").

In one embodiment, the network 105 is a Vehicular Ad-hoc Network ("VANET") that uses moving vehicles as nodes. The VANET network 105 supports the user of Dedicated Short Range Communications ("DSRC") between nodes. The DSRC works in 75 MHz of spectrum in the 5.9 GHz band. In one embodiment, the network 105 is a mobile network 105 where cars fall out of the signal range and drop out of the network 105 while other cars join in.

In the illustrated embodiment, the vehicle system 103a is communicatively coupled to the network 105 via signal line 119 (wirelessly). The user 125a interacts with the vehicle system 103a as represented by signal line 117. The vehicle systems 103b, 103n and the users 125b, 125n are coupled and interact in a similar manner respectively. In the illustrated embodiment, the communication server 101 is communicatively coupled to the network 105 via signal line 133 and signal line 135 (wirelessly). In one embodiment, signal lines 119 and 135 are any combination of wireless communication channels such as one or more of a 3G, 4G, GPS, DSRC or any other appropriate wireless network communication channels.

The communication server 101 is any computing device having a processor (not pictured) and a computer-readable storage medium (not pictured) to facilitate the vehicle systems 103 to implement congestion control based at least in part on weighted fair message rates. For example, the communication server 101 is a dedicated server for storing and providing information used by the vehicle systems 103 to adapt their message rates for congestion control. In one embodiment, the communication server 101 sends data to the vehicle systems 103 for synchronously implementing message rate congestion control algorithms.

A message rate specifies a speed at which a vehicle system 103 transmits messages through DSRC channels or any other appropriate wireless communication channels. A weighted fair message rate describes a vehicle's steady state message rate proportional to one or more other vehicles' steady state message rates. For example, a vehicle's steady state message rate is at a proportion (e.g., 2:1) to another vehicle's steady state message rate. Weighted fairness indicates that a ratio of steady state message rates for two vehicles is determined by a ratio of weights applied to those two vehicles. For purposes of clarity and convenience, the steady state message rate may also be referred to hereinafter as a steady state rate, a steady message rate and a steady rate. A message rate may also be referred to hereinafter as a rate.

The vehicle system 103 is a system embedded in a vehicle. For example, the vehicle is a car. In one embodiment, the vehicle system 103 transmits and/or receives information to and from other vehicle systems 103 and the communication server 101 via the network 105. For example, a vehicle system 103 exchanges information with other vehicle systems 103. In another example, a vehicle system 103 receives information (e.g., one or more parameters for implementing congestion control algorithms) from the communication server 101. In one embodiment, the vehicle system 103 adapts its message rate to the dynamic channel load and also adapts its message rate to a fixed proportion to rates of other vehicles. The vehicle system 103 will be described in further detail below with reference to FIGS. 2 and 3.

Vehicle System 103

Figure 2:
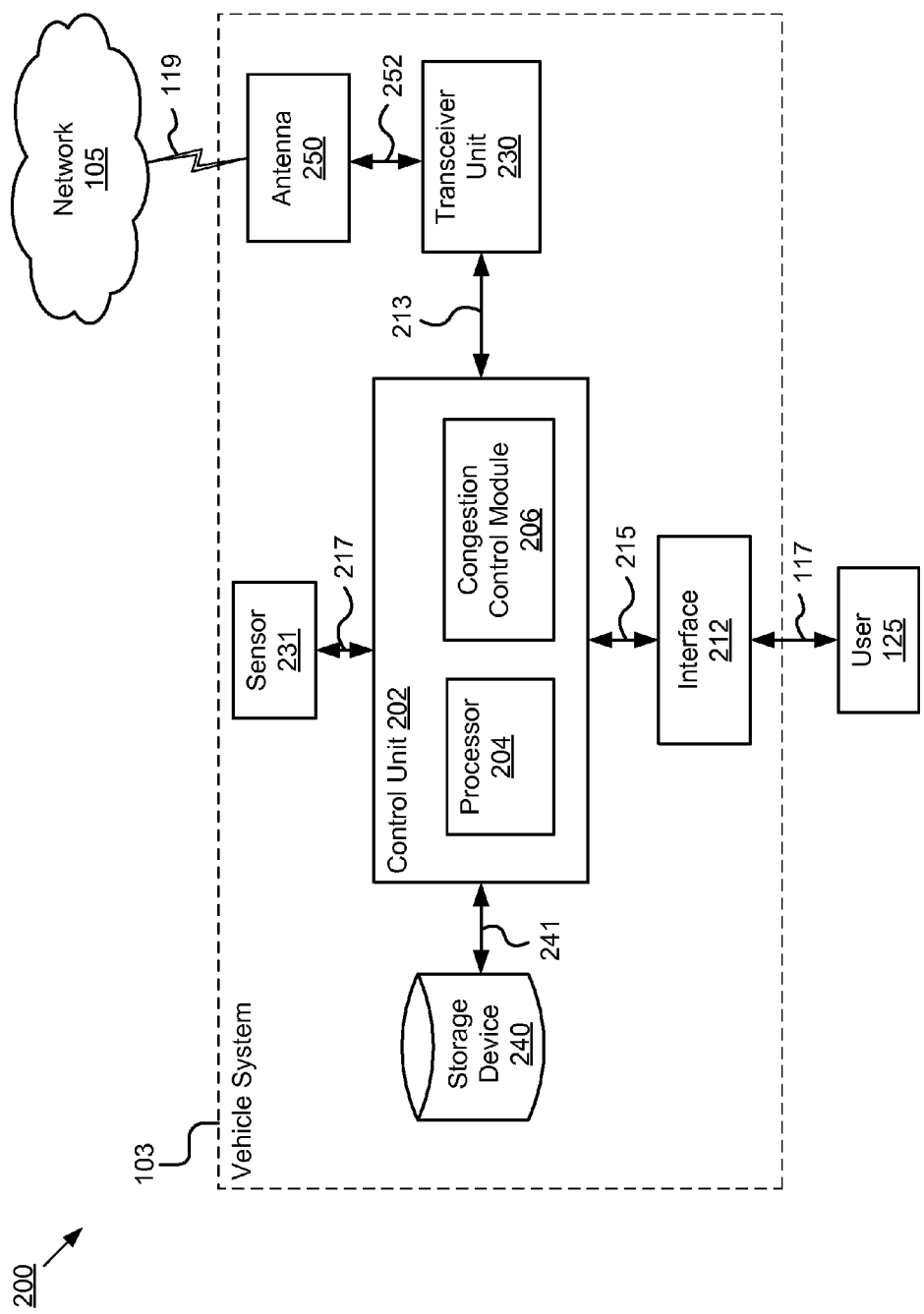
FIG. 2 is a block diagram illustrating a vehicle system in detail according to one embodiment.

Referring now to FIG. 2, depicted is an embodiment 200 of the vehicle system 103 in detail. The illustrated vehicle system 103 includes a control unit 202, a sensor 231, an interface 212, a storage device 240, a transceiver unit 230 and an antenna 250. Although only one control unit 202, one sensor 231, one interface 212, one storage device 240, one transceiver unit 230 and one antenna 250 are depicted in FIG. 2, persons having ordinary skill in the art will recognize that the vehicle system 103 can include any number of control units 202, sensors 231, interfaces 212, storage devices 240, transceiver units 230 and antennas 250. Furthermore, persons having ordinary skill in the art will also appreciate that the vehicle system 103 may include other entities not shown in FIG. 2 such as a speaker, a display device, an input device, etc.

In the illustrated embodiment, the interface 212 is communicatively coupled to the control unit 202 via signal line 215. The user 125 interacts with the interface 212 as represented by signal line 117. The sensor 231 is communicatively coupled to the control unit 202 via signal line 217. The storage device 240 is communicatively coupled to the control unit 202 via signal line 241. The transceiver unit 230 is communicatively coupled to the control unit 202 via signal line 213. The transceiver unit 230 is communicatively coupled to the antenna 250 via signal line 252. The antenna 250 is communicatively coupled to the network 105 via signal line 119 (wirelessly).

The transceiver unit 230 is any computing device that transmits and receives signals. For example, the transceiver unit 230 includes a DSRC device. In one embodiment, the transceiver unit 230 is implemented using hardware such as field-programmable gate array (FPGA) or an application-specific integrated circuit (ASIC). In another embodiment, the transceiver unit 230 is implemented using a combination of hardware and software.

In one embodiment, the transceiver unit 230 transmits and receives signals to and from the antenna 250. The antenna 250 transmits and receives signals wirelessly to and from the network 105. In one embodiment, the transceiver unit 230 transmits and receives signals to and from transceiver units 230 in other vehicle systems 103 via the network 105. In another embodiment, the transceiver unit 230 transmits and receives signals to and from the communication server 101 via the network 105. For example, the signals are modulated and/or encoded data such as modulated and/or encoded data describing traffic information, safety information, etc.

In one embodiment, the transceiver unit 230 receives data from the control unit 202. The transceiver unit 230 processes the received data by modulating and/or encoding the received data. The transceiver unit 230 then sends the modulated and/or encoded data to the transceiver units 230 in other vehicle systems 103 via the antenna 250. For example, the transceiver unit 230 receives data describing road conditions from the control unit 202. The transceiver unit 230 encodes the data describing the road conditions. The transceiver unit 230 sends the encoded data describing the road conditions to the transceiver unit 230 in another vehicle system 103 via the antenna 250.

In another embodiment, the transceiver unit 230 receives signals from another vehicle system 103 via the antenna 250. The transceiver unit 230 processes the received signals. For example, the transceiver unit 230 demodulates and/or decodes the received signals to obtain data, e.g., data describing traffic information and/or safety information. The transceiver unit 230 sends the data describing traffic information and/or safety information to the control unit 202 for displaying to the user via the interface 212.

In one embodiment, the transceiver unit 230 receives the determined message rate from the congestion control module 206 and adjusts the message rate for sending messages. In one embodiment, the transceiver unit 230 receives the determined message rate periodically at certain intervals and adjusts the message rate every time when the determined message rate is received. In another embodiment, the transceiver unit 230 receives the determined message rate in an episodic manner and adjusts the message rate every time when the determined message rate is received.

The control unit 202 is any processor-based computing device. For example, the control unit 202 is an electronic control unit ("ECU") implemented in a vehicle. In one embodiment, the control unit 202 is implemented using a single integrated circuit such as a system-on-chip (SOC). In one embodiment, the control unit 202 receives one or more sensor signals from the sensor 231. The control unit 202 processes the one or more sensor signals. The control unit 202 generates sensor data based at least in part on the processed sensor signals. In one embodiment, the control unit 202 stores the sensor data in the storage device 240. For example, the control unit 202 receives a sensor signal describing a vehicle speed. The control unit 202 processes the sensor signal and generates sensor data. The sensor data indicates the vehicle speed. The control unit 202 stores the sensor data in the storage device 240.

In one embodiment, the control unit 202 receives data from the transceiver unit 230. For example, the received data describes traffic information and/or safety information. The data is transmitted from other vehicle systems 103 via the network 105. The control unit 202 displays the traffic information and/or safety information to the user 125 via the interface 212.

In one embodiment, the control unit 202 comprises, among other things, a processor 204 and a congestion control module 206. In another embodiment, the control unit 202 includes other components conventional to a control unit such as a memory (not pictured) and an I/O interface (not pictured).

The processor 204 comprises an arithmetic logic unit, a microprocessor, a general purpose controller or some other processor array to perform computations, retrieve data stored on the storage device 240, etc. The processor 204 processes data signals and may comprise various computing architectures including a complex instruction set computer (CISC) architecture, a reduced instruction set computer (RISC) architecture, or an architecture implementing a combination of instruction sets. Although only a single processor 204 is shown in FIG. 2, multiple processors 204 may be included. The processing capability of the processor 204 may be limited to supporting the display of signals and the capture and transmission of signals. The processing capability of the processor might be enough to perform more complex tasks, including various types of feature extraction and sampling. It will be obvious to one skilled in the art that other processors, operating systems, sensors, displays and physical configurations are possible.

The congestion control module 206 is code and routines for implementing congestion control based at least in part on weighted fair message rates. For example, when a channel is congested, the congestion control module 206 adapts the vehicle's message rate to the dynamic channel load. In one embodiment, the congestion control module 206 also adapts the vehicle's message rate so that the vehicle's message rate converges to a weighted steady state rate which is at fixed proportions to steady rates of other vehicles. For example, the congestion control module 206 updates the vehicle's message rate recursively so that the vehicle's message rate converges to a steady rate at fixed proportions to one or more other vehicles' steady message rates. In one embodiment, the congestion control modules 206 in vehicles calculate and update vehicles' message rates in a distributed manner without the need of learning parameters from each other.

In one embodiment, the congestion control module 206 includes codes and routines stored in an on-chip storage of the processor 204. In another embodiment, the congestion control module 206 is implemented using hardware such as a field-programmable gate array (FPGA) or an application-specific integrated circuit (ASIC). In yet another embodiment, the congestion control module 206 is implemented using a combination of hardware and software. The congestion control module 206 is described below in more detail with reference to FIG. 3.

The sensor 231 is any type of conventional sensor configured to collect any type of data. For example, the sensor 231 is one of the following: a light detection and ranging (LIDAR) sensor; an infrared detector; a motion detector; a thermostat; and a sound detector, etc. Persons having ordinary skills in the art will recognize that other types of sensors are possible. In one embodiment, the sensor 231 measures a condition related to a vehicle. The sensor 231 generates a sensor signal describing the condition based at least in part on the measurement. For example, the sensor 231 measures one of a steering angle, a brake angle, a vehicle speed, a moving direction, an acceleration and/or deceleration of a vehicle, a temperature inside a vehicle, whether fog lights are on and whether windshield wipers are on or off, an amount of used gas, an amount of used wireless energy, etc. The sensor 231 generates a sensor signal describing the measurement. In another embodiment, the sensor 231 measures a condition in an environment that is external to the vehicle and generates a sensor signal describing the measurement. For example, the sensor 231 measures a percentage of humidity in an environment and generates a sensor signal describing the measurement. In another example, the sensor 231 detects a pot hole on the road and measures the location of the pot hole on the road. The sensor 231 generates a sensor signal describing the location of the pot hole on the road. The sensor 231 sends the sensor signal to the control unit 202.

In one embodiment, the vehicle system 103 includes a combination of different types of sensors 231. For example, the vehicle system 103 includes a first sensor 231 for monitoring a steering angle of a steering device in a vehicle, a second sensor 231 for monitoring a speed of the vehicle and a third sensor 231 for monitoring a brake angle of a brake device in the vehicle.

The interface 212 is a device configured to handle communications between the user 125 and the control unit 202. For example, the interface 212 includes one or more of an in-vehicle touch screen for receiving inputs from the user 125 and a microphone for capturing voice inputs from the user 125. The interface 212 sends the inputs from the user 125 to the control unit 202. In one embodiment, the interface 212 is configured to transmit an output from the control unit 202 to the user 125. For example, the interface 212 includes an audio system for playing a voice prompt to the user 125 indicating communication congestions. In other examples, the interface 212 includes a display device for displaying a road condition and/or a traffic condition to the user 125. One having ordinary skill in the art will recognize that the interface 212 may include other types of devices for providing the functionality described herein.

The user 125a is a human user. In one embodiment, the user 125a is a driver driving a vehicle on a road. The user 125a interacts with, or otherwise provides an input to, an interface 212, which sends and receives different types of data to and from the control unit 202. For example, the interface 212 is a touch screen and the user 125a touches a portion of the touch screen with a finger or a stylus to provide an input.

The storage device 240 is a non-transitory memory that stores data. For example, the storage device 240 is a dynamic random access memory (DRAM) device, a static random access memory (SRAM) device, flash memory or some other memory device known in the art. In one embodiment, the storage device 240 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The storage device 240 is described below in more detail with reference to FIG. 4.

The antenna 250 is an electrical device that converts electric currents into radio waves, and vice versa. For example, the antenna 250 is a steerable beam directional antenna. The antenna 250 is used with the transceiver unit 230. In one embodiment, the antenna 250 receives signals from the network 105 and sends the received signals to the transceiver unit 230 for processing. In another embodiment, the antenna 250 receives signals from the transceiver unit 230 and delivers the signals to other vehicle systems 103 via the network 105.

Congestion Control Module 206

Figure 3:
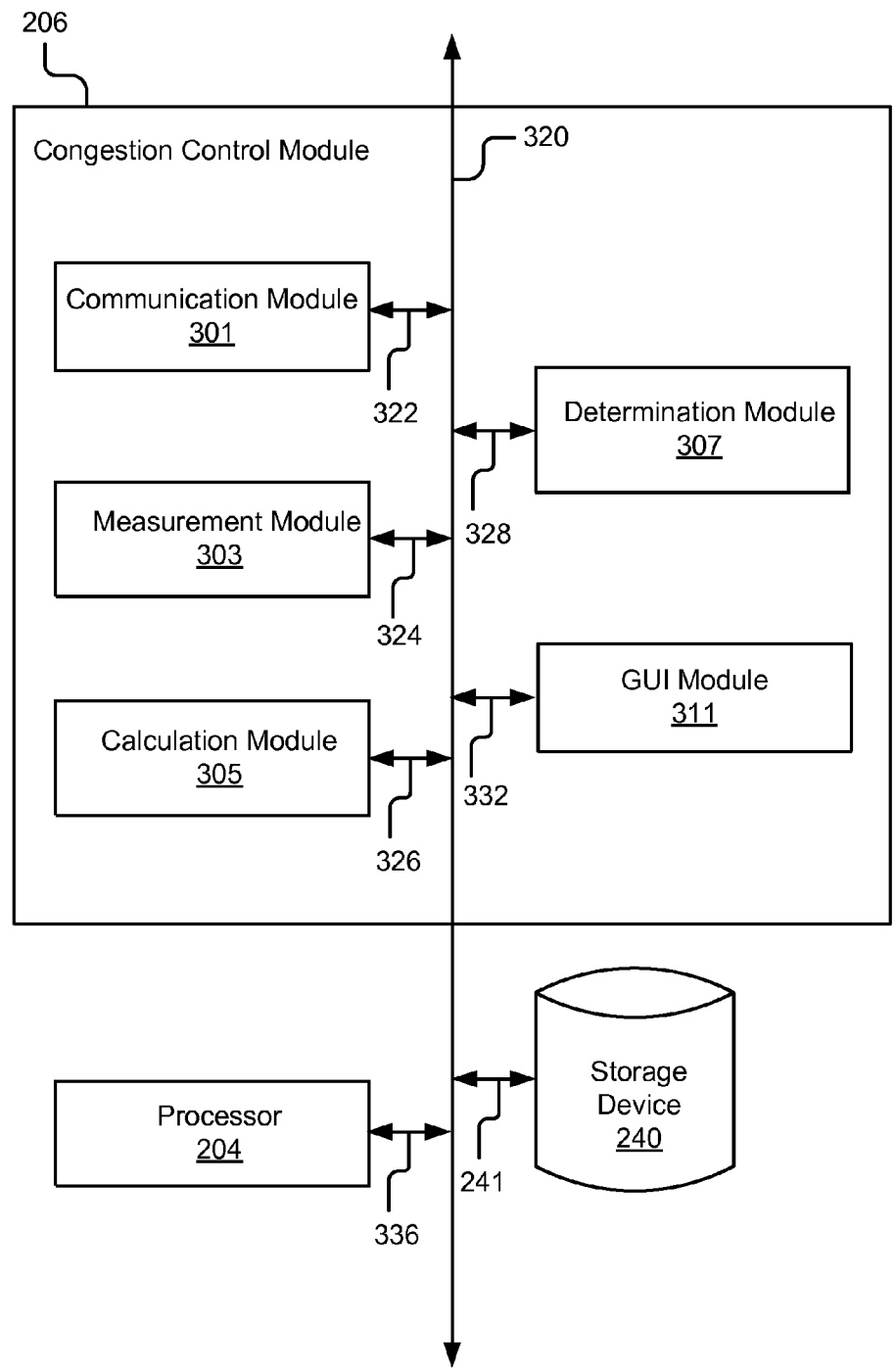
FIG. 3 is a block diagram illustrating a congestion control module according to one embodiment.

Referring now to FIG. 3, a congestion control module 206 is shown in more detail. FIG. 3 is a block diagram illustrating the congestion control module 206 according to one embodiment. The congestion control module 206 comprises a communication module 301, a measurement module 303, a calculation module 305, a determination module 307 and a graphical user interface (GUI) module 311. These components of the congestion control module 206 are communicatively coupled to a bus 320 for communication with one another. In the illustrated embodiment, the processor 204 is communicatively coupled to the bus 320 via signal line 336. The storage device 240 is communicatively coupled to the bus 320 via signal line 241.

The communication module 301 is code and routines for handling communication between components of the congestion control module 206 and other components of the vehicle system 103. In one embodiment, the communication module 301 receives network messages from the network 105 and delivers the network messages to the measurement module 303 for measuring a CBR based at least in part on the network messages. In one embodiment, the communication module 301 receives a determined message rate from the determination module 307 and delivers the determined message rate to the transceiver unit 230 for transmit messages based at least in part on the determined message rate. In one embodiment, the communication module 301 receives synchronization signal from the network 105 and sends the synchronization signal to one or more appropriate modules in the congestion control module 206 for synchronously implementing a message rate based congestion control algorithm. The communication module 301 is communicatively coupled to the bus 320 via signal line 322.

In one embodiment, the communication module 301 receives graphical data from the GUI module 311. The communication module 311 sends the graphical data to the interface 212 via the control unit 202 for displaying information to a user 125. For example, the graphical data is used to generate a user interface for displaying communication conditions (e.g., communication congestions) to the user 125.

In one embodiment, the communication module 301 also handles the communications between other sub-modules 303, 305, 307, 309 and 311 in the congestion control module 206. For example, the communication module 301 communicates with the measurement module 303 and the calculation module 305 to pass an output of the measurement module 303 (e.g., a measured Channel Busy Ratio ("CBR")) to the calculation module 305. However, this description may occasionally omit mention of the communication module 301 for purposes of clarity and convenience. For example, for purposes of clarity and convenience, the above scenario may be described as the measurement module 303 passing an output (e.g., a measured CBR) to the calculation module 305.

The measurement module 303 is code and routines for measuring a CBR. A CBR is the fraction of time during which the communication channel is busy. In one embodiment, the measurement module 303 receives a network message from the network via the communication module 301. The measurement module 303 measures a CBR based at least in part on the network message. For example, the measurement module 303 analyzes the network message and calculates a CBR. In one embodiment, the measurement module 303 measures a CBR for a communication channel periodically at certain intervals. The intervals are fixed and/or predetermined. For example, the measurement module 303 measures a CBR for a DSRC channel periodically, e.g., every 10 milliseconds, every 100 milliseconds, every 200 milliseconds, every one second, every 30 seconds, every one minute, every five minutes, etc. In another embodiment, the measurement module 303 episodically measures a CBR for a communication channel. For example, the measurement module 303 measures a CBR for a communication channel at irregular intervals. In one embodiment, the measurement module 303 performs the measurement based at least in part on a synchronous signal from the communication server 101 via the network 105.

In one embodiment, the measurement module 303 sends the measured CBR to the calculation module 305. In one embodiment, the measurement module 303 stores the measured CBR in the storage 240. The measurement module 303 is communicatively coupled to the bus 320 via signal line 324.

The calculation module 305 is code and routines for calculating a ratio error based at least in part on a measured CBR. For example, the calculation module 305 receives a measured CBR from the measurement module 303. The calculation module 305 calculates a ratio error based at least in part on the measured CBR. The calculation module 305 is communicatively coupled to the bus 320 via signal line 326.

In one embodiment, the calculation module 305 determines a target CBR and calculates a ratio error based at least in part on the measured CBR and the target CBR. The calculation module 305 determines the target CBR in many different ways. In one embodiment, the calculation module 305 determines a target CBR to optimize some aspects of communication performance. For example, the calculation module 305 chooses a target CBR to maximize throughput in a channel (e.g., a message packets number per second). In another example, the calculation module 305 chooses a target CBR based at least in part on a set of more complex criteria (e.g., to achieve a trade-off between the throughput and a packet error ratio ("PER")). In another embodiment, the calculation module 305 receives data indicating a target CBR from the communication server 101 via the network 105.

In one embodiment, the calculation module 305 calculates a ratio error by comparing the measured CBR with the target CBR. For example, the calculation module 305 calculates a ratio error as the difference between the target CBR and the measured CBR. In one embodiment, the calculation module 305 calculates the ratio error periodically at certain intervals. For example, the calculation module 305 calculates a ratio error periodically, e.g., every 10 milliseconds, every 100 milliseconds, every 200 milliseconds, every one second, every 30 seconds, every one minute, every five minutes, etc. In another embodiment, the calculation module 305 episodically calculates the ratio error. For example, the calculation module 305 calculates the ratio error at irregular intervals. In one embodiment, the calculation module 305 calculates the ratio error every time when the measured CBR is measured by the measurement module 303. In one embodiment, the calculation module 305 calculates a ratio error based at least in part on the synchronous signal from the communication server 101.

In one embodiment, this calculation for the ratio error can be defined as the following equation.

$$e(t) = CBR_{target} - CBR_{measured},$$

where, the symbol "e(t)" represents the ratio error at time "t"; the symbol "$CBR_{target}$" represents the target CBR and the symbol "$CBR_{measured}$" represents the measured CBR. In one embodiment, symbol "t" represents the time when the measured CBR is measured. The calculation module 305 calculates a ratio error at the time when the measured CBR is measured. In one embodiment, the calculation module 305 sends the calculated ratio error to the determination module 307 for determining a message rate update.

The determination module 307 is code and routines for determining a message rate update based at least in part on the ratio error. In one embodiment, the determination module 307 implements one or more congestion control algorithms to determine a message rate update. In one embodiment, the determination module 307 determines parameters for the one or more congestion control algorithms including weighting parameters. A weighting parameter is a parameter used in either of the algorithms which determines the weighted steady state message rate. The determination module 307 then determines a message rate update by implementing the one or more algorithms based at least in part on the parameters including the weighting parameters. In this way, the message rate for the vehicle converges to a weighted steady state message rate. The determination module 307 determines the parameters and thus the message rate for the vehicle 103 in a distributed manner without learning parameters from other vehicles. The determination module 307 is communicatively coupled to the bus 320 via signal line 328.

In one embodiment, the determination module 307 implements an Additive Increase Multiplicative Decrease ("AIMD") algorithm to determine a message rate update. By implementing the AIMD algorithm, the determination module 307 makes message rate update decision based at least in part on the sign of the ratio error. In one embodiment, the determination module 307 determines the sign of the ratio error. For example, if the determination module 307 determines that the ratio error is not positive, then the determination module 307 determines the message rate based at least in part on a multiplicative decrease parameter. In other words, if the determination module 307 determines that the measured CBR is above the target CBR, the determination module 307 decreases the message rate in a multiplicative manner. For example, the determination module 307 decreases the message rate in a proportion of the current message rate. One example of the proportion can be 10%. For example, if the current message rate is 6 Hz, the determination module 307 decreases the message rate by 0.6 Hz. If the determination module 307 determines that the ratio error is positive, then the determination module 307 determines the message rate based at least in part on an additive increase parameter. In other words, if the determination module 307 determines that the measured CBR is below the target CBR, the determination module 307 increases the message rate in an additive manner. For example, the determination module 307 increases the message rate by a fixed amount, e.g., 0.1 Hz. This process is described mathematically below with reference to equations for the AIMD algorithm.

In one embodiment, the determination module 307 determines the sign of the ratio error and thus the message rate periodically at certain intervals. The intervals are fixed and/or predetermined. For example, the determination module 307 determines the sign of the ratio error and thus the message rate periodically, e.g., every 10 milliseconds, every 100 milliseconds, every 200 milliseconds, every one second, every 30 seconds, every one minute, every five minutes, etc. In another embodiment, the determination module 307 episodically determines the sign of the ratio error and thus the message rate. For example, the determination module 307 determines the sign of the ratio error and thus the message rate at irregular intervals. In one embodiment, the determination module 307 determines the sign of the ratio error and thus the message rate every time when the calculation module 305 calculates a ratio error at a time step. In one embodiment, the determination module 307 performs the determination of the sign of the ratio error and thus of the message rate based at least in part on the synchronous signal from the communication server 101.

In one embodiment, the determination module 307 determines the message rate recursively. For example, the determination module 307 determines the message rate at one time step based at least in part on a message rate at a previous time step. In one embodiment, the process for updating message rate using the AIMD algorithm can be described mathematically as the following equations:

If $(e_i(t) \leq 0) r_i(t+1) = (1-\gamma) r_i(t),$

Else $r_i(t+1) = r_i(t) + \delta,$ where, the symbol "$r_i(t)$" represents the message rate of vehicle "i" at time "t", the symbol "$\gamma$" represents the multiplicative decrease parameter and the symbol "$\delta$" represents the additive increase parameter. In one embodiment, the symbol "t" represents the time when the ratio error is calculated, which is also the time when the measured CBR is measured. The symbol "t+1" represents the future time that is one time step after the time "t." Therefore, the symbol "$r_i(t+1)$" represents the determined message rate for the future time. In one embodiment, the symbol "i" represents an index of a vehicle. In one embodiment, the additive increase parameter is a weighting parameter that affects the weighted steady state message rate when implementing the AIMD algorithm. As described above, one example for the multiplicative decrease parameter "$\gamma$" can be 10%. One example for the additive increase parameter "$\delta$" can be 0.1 Hz.

In one embodiment, the determination module 307 implements a LInear Message Rate Integrated Control ("LIMERIC") algorithm. By implementing the LIMERIC algorithm, the determination module 307 calculates a comparing factor and compares the comparing factor with a maximum gain. The maximum gain is the gain saturation parameter used in the LIMERIC algorithm. The determination module 307 determines the message rate based at least in part on the comparison. For example, if the determination module 307 determines that the comparing factor is larger than the maximum gain, then the determination module 307 updates the ratio error based at least in part on the maximum gain and determines the message rate based at least in part on the updated ratio error. If the determination module 307 determines that the comparing factor is not larger than the maximum gain, then the determination module 307 does not update the ratio error and determines the message rate based at least in part on the unchanged ratio error received from the calculation module 305.

In one embodiment, the determination module 307 compares the comparing factor with the maximum gain and then determines the message rate periodically at certain intervals. The intervals are fixed and/or predetermined. For example, the determination module 307 compares the comparing factor with the maximum gain and then determines the message rate periodically, e.g., every 10 milliseconds, every 100 milliseconds, every 200 milliseconds, every one second, every 30 seconds, every one minute, every five minutes, etc. In another embodiment, the determination module 307 compares the comparing factor with the maximum gain and then determines the message rate episodically. For example, the determination module 307 compares the comparing factor with the maximum gain and then determines the message rate at irregular intervals. In one embodiment, the determination module 307 compares the comparing factor with the maximum gain and then determines the message rate every time when the calculation module 305 calculates a ratio error at a time step.

In one embodiment, similar to implementing the AIMD algorithm, the determination module 307 determines the message rate recursively by implementing the LIMERIC algorithm. For example, the determination module 307 determines the message rate at one time step based at least in part on a message rate at a previous time step. In one embodiment, the process for updating message rate using LIMERIC algorithm can be described mathematically as the following equations:

If $(\beta|e(t)|>\text{MaxGain})e(t)=\text{sign}(e(t))*\text{MaxGain}/\beta$ $r_i(t+1)=(1-\alpha)*r_i(t)+\beta*e(t)$, Where, the symbols "α" and "β" represent adaptive parameters used in LIMERIC and the symbol "MaxGain" represents the maximum gain which is the gain saturation parameter used in LIMERIC. In one embodiment, the adaptive parameter "α" is an exponential forgetting factor that promotes fair convergence. The adaptive parameter "β" is a scale factor that linearly offsets the message rate with the ratio error. In one embodiment, the maximum gain parameter "MaxGain" can have a positive value and a negative value, which can be represented by "MaxGainPos" and "MaxGain-Neg." The positive value and negative value are different. Accordingly, in one embodiment, if the ratio error is positive, the "MaxGainPos" is used in the above equations to compare with the comparing factor and update the ratio error. If the ratio error is negative, the "MaxGainNeg" is used in the above equations to compare with the comparing factor and update the ratio error. In one embodiment, the symbol "t" represents the time when the ratio error is calculated, which is also the time when the measured CBR is measured. The symbol "t+1" represents the future time that is one time step after the time "t." Therefore, the symbol "$r_i(t+1)$" represents the determined message rate for the future time. In one embodiment, the symbol "i" represents an index of a vehicle. In one embodiment, the adaptive parameter "β" is a weighting parameter that affects the weighted steady state message rate when implementing the LIMERIC algorithm.

In one embodiment, the determination module 307 determines one or more parameters including the weighting parameters used in the AIMD and LIMERIC algorithms. In one embodiment, the determination module 307 receives data describing the parameters used in the AIMD and LIMERIC algorithms from the communication server 101 via the network 105. In one embodiment, the determination module 307 learns data describing the parameters used in the AIMD and LIMERIC algorithms from other vehicles.

In one embodiment, the determination module 307 sets the weighting parameter used in either the AIMD or the LIMERIC algorithm to a constant. For example, the determination module 307 in every vehicle system 103 sets the weighting parameters to the constant "1." As a result, the message rates for all vehicle systems 103 converge to the same steady state rate.

In one embodiment, the determination module 307 varies the above mentioned parameters for either algorithm so that the message rate converges to a different rate at a steady state. In one embodiment, the determination module 307 varies the additive increase parameter noted as "δ" in the equations for the AIMD algorithm, causing the message rate converges to a different steady rate. In this way, the message rate for the vehicle system 103 can converge to a different steady rate from the steady rates for other vehicle systems 103. For example, the determination module 307 in the vehicle system 103a uses a first additive increase parameter when implementing the AIMD algorithm. The determination module 307 in the vehicle system 103b uses a second additive increase parameter when implementing the AIMD algorithm. The first additive increase parameter is different from the second additive increase parameter. For example, the first additive increase parameter is two times of the second additive increase parameter. As the AIMD algorithm is being implemented synchronously in the two vehicle systems 103a, 103b, the message rates for the two vehicle systems 103a, 103b converge to a first steady message rate and a second steady message rate for the two vehicle systems 103a, 103b, respectively. The first steady message rate for vehicle system 103a is two times of the second steady message rate for vehicle system 103b. In other words, the ratio between the two steady message rates is the same as the ratio between the two additive increase parameters. Therefore, the determination module 307 can varies the additive increase parameter for implementing the AIMD algorithm to control the message steady rate. One embodiment of this process is described below.

In one embodiment, the determination module 307 determines a ratio of weights and determines a parameter ratio based at least in part the ration of weights. A parameter ratio describes one or more proportions between parameters for different vehicle systems 103. For example, the determination module 307 determines a ratio of weights as 2:1. The determination module 307 determines a parameter ratio to be equal to the ratio of weights, e.g., 2:1. The parameter ratio describes one or more proportions between a parameter for a first vehicle system 103a and one or more parameters for one or more other vehicle systems 103. For example, the parameter ratio describes a proportion between the additive increase parameter for a first vehicle system 103a and the additive increase parameter for a second vehicle system 103b. In another example, the parameter ratio describes a proportion between one of the adaptive parameters for implementing the LIMERIC algorithm for a first vehicle system 103a and that for a second vehicle system 103b.

In one embodiment, the determination module 307 determines the additive increase parameter value for implementing the AIMD algorithm based at least in part on the parameter ratio. For example, the determination module 307 determines the additive increase parameter value used in the AIMD algorithm for a first vehicle system 103a based at least in part on the parameter ratio. The determination module 307 in a second vehicle system 103b synchronously determines the additive increase parameter value used in the AIMD algorithm for the second vehicle system 103b based at least in part on the parameter ratio as well. As a result, after the AIMD algorithm is implemented synchronously in the two vehicle systems 103a, 103b, the message rate for the first vehicle system 103a converges to a steady state rate which is at a fixed proportion to a steady state rate for the second vehicle system 103b.

Similarly, in one embodiment, the determination module 307 controls the steady message rate by varying the weighting parameter used in the LIMERIC algorithm. In one embodiment, the determination module 307 varies one of the adaptive parameters for implementing the LIMERIC algorithm to achieve a different steady message rate. For example, the determination module 307 adjusts the adaptive parameter noted as "β" in the equations for the LIMERIC algorithm. As the determination module 307 implements the LIMERIC algorithm with the adjusted adaptive parameter "β", the message rate converges to a different steady rate.

In one embodiment, the determination module 307 determines the adaptive parameter "β" used in the LIMERIC algorithm based at least in part on the parameter ratio. For example, the determination module 307 determines the adaptive parameter "β" used in the LIMERIC algorithm for a first vehicle system 103a based at least in part on the parameter ratio. The determination module 307 in a second vehicle system 103b synchronously determines the adaptive parameter "β" used in the LIMERIC algorithm for the second vehicle system 103b based at least in part on the parameter ratio as well. As a result, after the LIMERIC algorithm is implemented synchronously in the two vehicle systems 103a, 103b, the message rate for the first vehicle system 103a converges to a steady rate which is at a fixed proportion to a steady rate for the second vehicle system 103b.

In one embodiment, the relationship between the weighting parameters and the steady message rates can be written as the following:

$$R_1:R_2:\ldots:R_K=\delta_1:\delta_2:\ldots:\delta_K \text{(For the AIMD algorithm)},$$

$$R_1:R_2:\ldots:R_K=\beta_1:\beta_2:\ldots:\beta_K \text{(For the LIMERIC algorithm)},$$

where, the symbol "$R_j$" represents the steady message rate for vehicle "j", the symbol "$\delta_j$" represents the additive increase parameter for the AIMD algorithm and the symbol "$\beta_j$" represents the adaptive parameter for the LIMERIC algorithm. In one embodiment, the symbol "j" represents an index of a vehicle.

In one embodiment, the determination module 307 determines a weighting parameter value based at least in part on acceleration or deceleration of the vehicle. For example, the determination module 307 assigns a higher value to the weighting parameter for a vehicle with a higher magnitude of acceleration or deceleration so that the vehicle with a higher magnitude of acceleration or deceleration can have a higher steady state message rate. The motivation behind this is that nodes (e.g., vehicles) with a higher magnitude of acceleration have higher dynamics and so can have a higher probability of physically colliding with other nodes. Therefore, a higher steady message rate can make these vehicles transmit more information (e.g., their physical locations) in a fixed time period to other vehicles so that collisions are more possibly to be avoided. In one embodiment, the determination module 307 uses other factors modeling dynamics of nodes instead of acceleration and deceleration to determine the weighting parameter value.

In one embodiment, the determination module 307 determines a weighting parameter value based at least in part on a type of the vehicle. For example, the determination module 307 determines different parameter values for different types of vehicles. The types of vehicles include emergency service vehicle (e.g., ambulance, police car), motorbike and private vehicle. Emergency service vehicles often drive at much higher speeds and changes lanes much more frequently. Accidents with motorbikes are much more dangerous and also sometimes it is hard to see motor-bikers. Therefore, these vehicles need to transmit messages at higher speeds to avoid accidents on the road. Accordingly, in one embodiment, the determination module 307 assigns higher values to the weighting parameters for the emergency service vehicles and motorbikes. For example, the determination modules 307 determine different weighting parameter values for an emergency service vehicle (e.g., an ambulance, a police car) and a private vehicle. Assume that the ratio of these weighting parameter values is 2:1. By synchronously implementing the AIMD or the LIMERIC algorithm using the different weighting parameter values, the emergency service vehicle and the private vehicle adapt their message rates to steady rates which are in the same ratio of 2:1 as the ratio of the weighting parameter values. In another embodiment, the determination module 307 assigns different weighting parameter values to emergency service vehicles and motorbikes. For example, the weighting parameter values for emergency service vehicles and motorbikes are at a ratio of 5:3. In this way, the determination module 307 determines the weights based at least in part on priorities of vehicles and thus the message rates that they use over the wireless channels.

In one embodiment, the determination module 307 determines a weighting parameter value for the vehicle based at least in part on considerations other than above-mentioned factors in the vehicular collision avoidance scenario. For example, the determination module 307 determines a weighting parameter value based at least in part on the content of the message or how much price the vehicle user is paying. Although this is particularly beneficial in bursty vehicular wireless communication scenario, this method can also be applicable to other traffic outside the vehicular communication scenario. For example, this method can be applied to wireless data traffic in Wi-Fi systems where data comes in burst and this method can be used to these Wi-Fi systems to achieve weighted fairness. For example, the weights for various Wi-Fi users can be determined based at least in part on the prices they pay. Beneficially, this method is used in a public place (e.g., an airport) providing a Wi-Fi service. This method offers a plan where users can pay different prices for different data rates. In another example, the vehicles in communication are boats or kayaks while being in water. The determination module 307 determines the weighting parameter values for the boats and the kayaks based at least in part on requirement for them or for passengers on them so that they converge to different message rates.

In one embodiment, the determination module 307 sends the determined message rate for the future time to the transceiver unit 230. In one embodiment, the determination module 307 sends the determined message rate periodically at certain intervals. For example, the determination module 307 determines the message rate periodically (e.g., every 100 milliseconds) and sends the determined message rate every time the message rate is determined. In another embodiment, the determination module 307 sends the determined message episodically at irregular intervals. In one embodiment, the determination module 307 stores the determined message rate in the storage 240.

The GUI module 311 is code and routines for providing graphical data for a user 125. The GUI module 311 is communicatively coupled to the bus 320 via signal line 332. In one embodiment, the GUI module 311 generates graphical data for depicting a user interface to notify a user 125 the current communication condition. For example, the ratio error indicates that the communication channel is currently congested. The graphical data is used to generate a user interface displaying the communication channel is currently congested. In other embodiments, the GUI module 311 generates graphical data for depicting a user interface by which a user 125 inputs information to the communication system 103. The GUI module 311 sends the generated graphical data to the interface 212, causing the interface 212 to present the user interface to the user 125.

Storage Device 240

Figure 4:
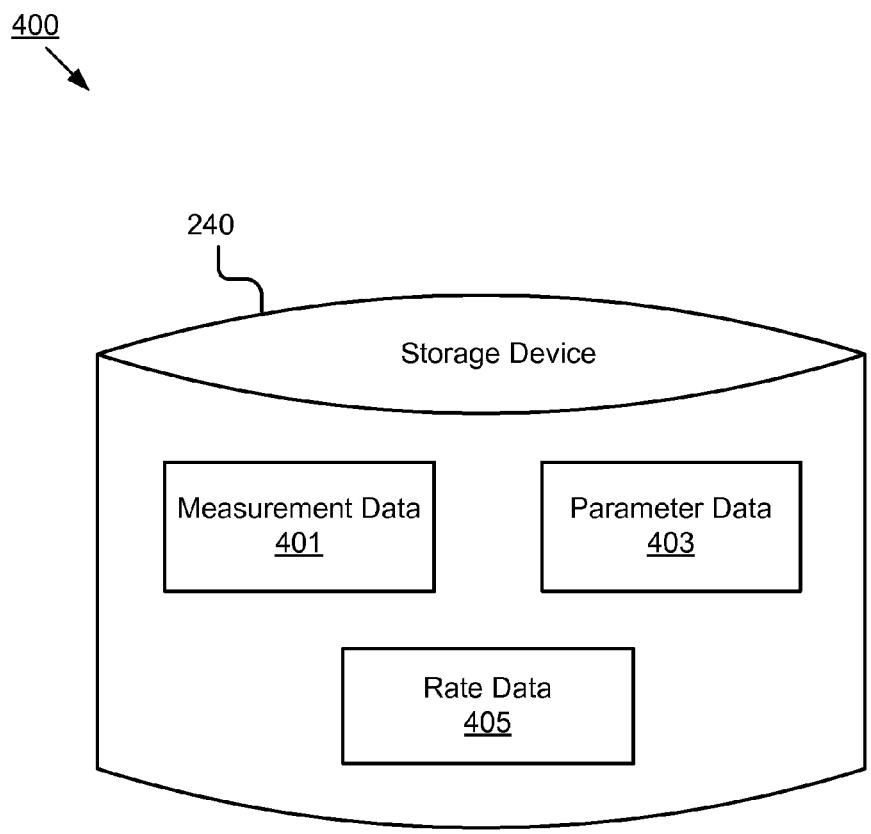
FIG. 4 is a block diagram illustrating a storage device according to one embodiment.

FIG. 4 is a block diagram 400 illustrating a storage device 240 according to one embodiment. The storage device 240 includes measurement data 401, parameter data 403 and rate data 405. One skilled in the art will recognize that the storage device 240 may include other data for providing the functionality described herein.

The measurement data 401 is data describing measurements including a measured CBR. For example, the measurement data 401 includes a measured CBR generated by the measurement module 303 based at least in part on network messages.

The parameter data 403 is data describing parameters for implementing the AIMD algorithm and/or the LIMERIC algorithm. The parameters include weighting parameters used in the AIMD algorithm and/or the LIMERIC algorithm. For example, the parameter data 403 includes data describing a multiplicative decrease parameter and an additive increase parameter for the AIMD algorithm. In another example, the parameter data 403 includes data describing two adaptive parameters and a gain saturation parameter for the LIMERIC algorithm. In one embodiment, the parameter data 403 is determined and stored by the determination module 307.

The rate data 405 is data describing message rates. For example, the rate data 405 describes one or more determined message rates. In another example, the rate data 405 also includes a set of recursively adjusted message rates for the vehicle system 103.

Methods

Referring now to FIGS. 5-7B, various embodiments of the method of the specification will be described.

Figure 5:
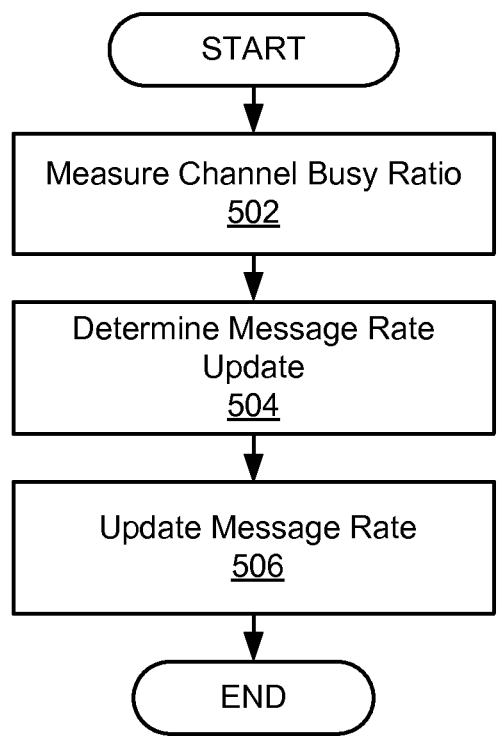
FIG. 5 is a flow diagram illustrating a method for updating a message rate according to one embodiment.

FIG. 5 is a flow diagram illustrating a method 500 for updating a message rate for the vehicle according to one embodiment. The communication module 301 receives one or more network messages. The measurement module 303 measures 502 a CBR based at least in part on the one or more network messages. The determination module 307 determines 504 a message rate update based at least in part on the measured CBR and a target CBR. In one embodiment, the determination module 307 also determines a set of parameters and implements the AIMD algorithm or the LIMERIC algorithm using the set of parameters to determine the message rate update. The transceiver unit 230 updates 506 the message rate based at least in part on the determined message rate update.

Figure 6:
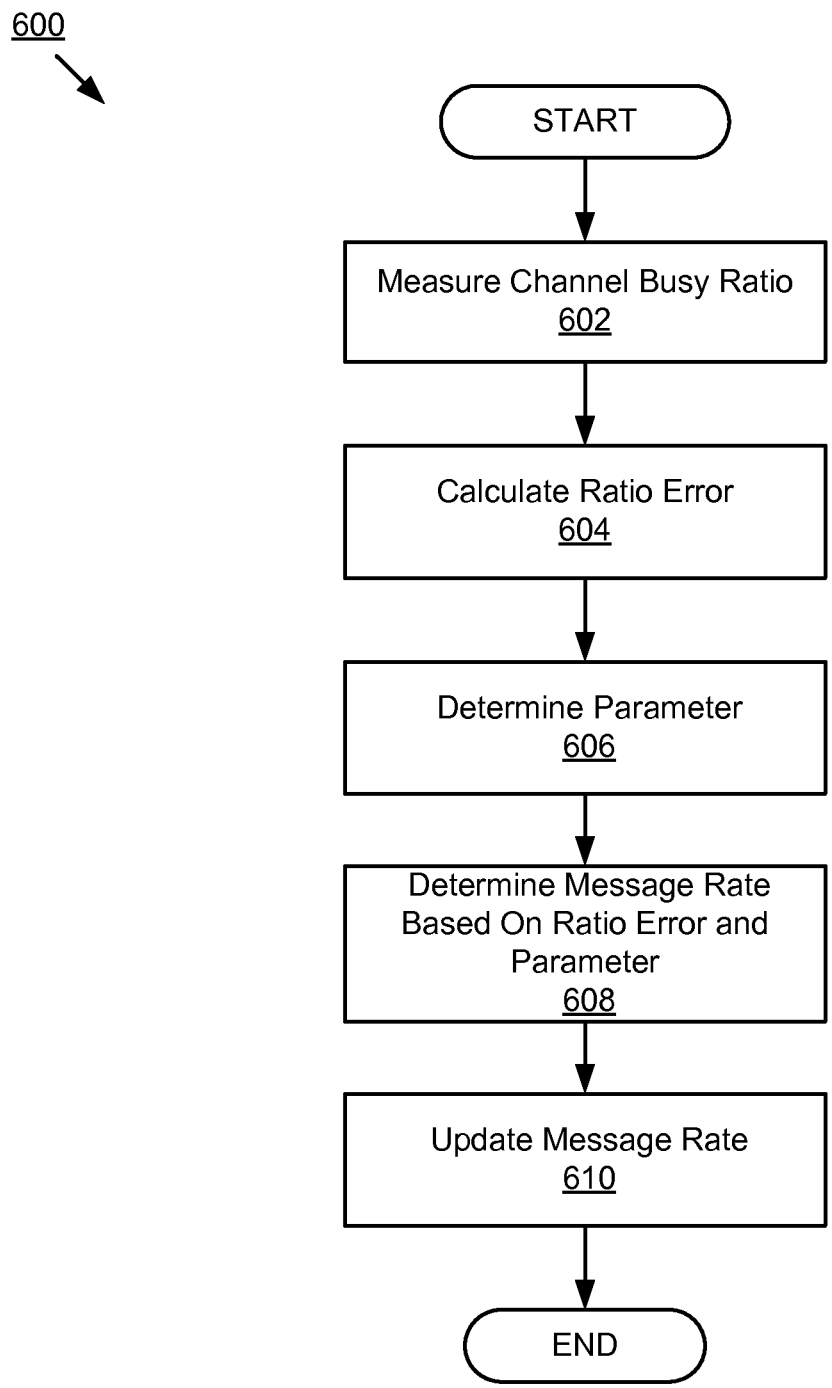
FIG. 6 is a flow diagram illustrating a method for updating a message rate according to another embodiment.

FIG. 6 is a flow diagram illustrating a method 600 for updating a message rate for the vehicle according to another embodiment. The communication module 301 receives one or more network messages. The measurement module 303 measures 602 a CBR based at least in part on the one or more network messages. The calculation module 305 calculates 604 a ratio error based at least in part on the measured CBR. In one embodiment, the calculation module 305 calculates the ratio error by comparing the measured CBR with a target CBR.

The determination module 307 determines 606 one or more parameters for implementing the AIMD algorithm or the LIMERIC algorithm to adapt the message rate. The one or more parameters include weighting parameters. The determination module 307 determines 608 a message rate based at least in part on the ratio error and the one or more parameters. For example, the determination module 307 determines the sign of the ratio error and determines a message rate based at least in part on the sign of the ratio error and two parameters for the AIMD algorithm. The step 608 will be described in further detail below with reference to FIGS. 7A-7B. The transceiver unit 230 updates 610 the message rate for the vehicle based at least in part on the determined message rate.

Figure 7A:
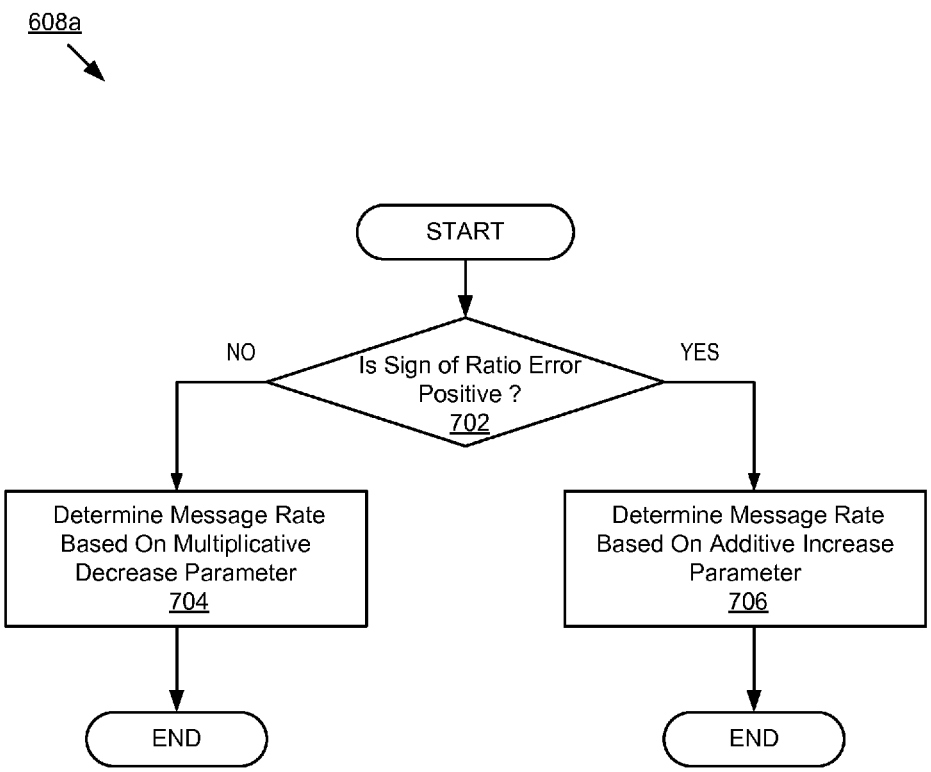
FIGS. 7A-7B are flow diagrams illustrating methods for determining a message rate according to two embodiments.
Figure 7B:
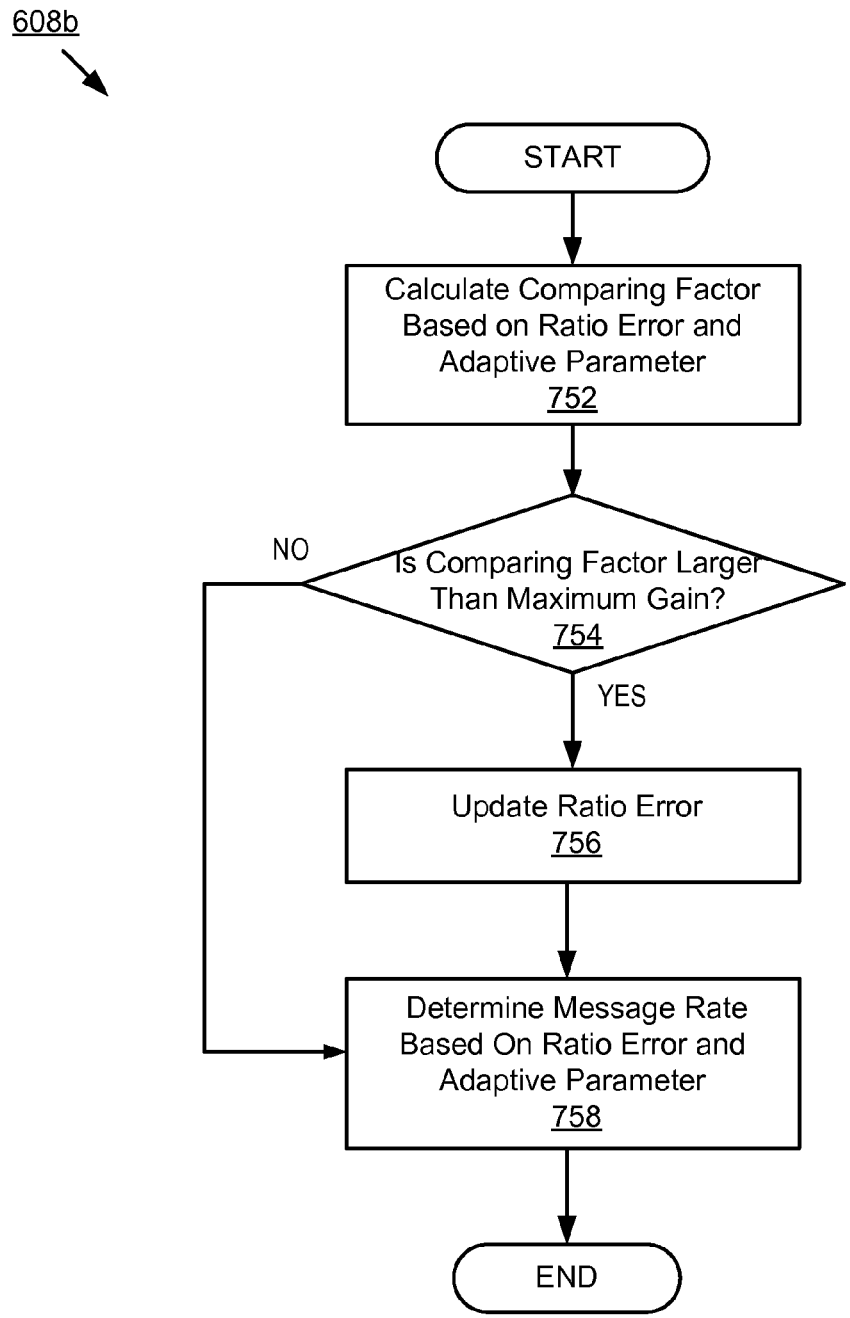

FIGS. 7A-7B are flow diagrams illustrating a method 608 for determining a message rate according to two embodiments. FIG. 7A is a flow diagram illustrating a method 608a for determining a message rate by implementing the AIMD algorithm. The method 608a starts with the determination module 307 determining 702 if the sign of the ratio error is positive. If at step 702 the determination module 307 determines that the sign of the ratio error is not positive, the method 608a proceeds to step 704. At step 704, the determination module 307 determines a message rate based at least in part on the multiplicative decrease parameter used in the AIMD algorithm.

If at step 702 the determination module 307 determines that the sign of the ratio error is positive, the method 608a proceeds to step 706. At step 706, the determination module 307 determines a message rate based at least in part on the additive increase parameter used in the AIMD algorithm. The calculation equation at either situation has been described in detail with reference to FIG. 3. In one embodiment, the method 608a is implemented by the determination module 307 periodically at certain intervals. For example, the determination module 307 determines the sign of the ratio error periodically (e.g., every 100 milliseconds) and thus determines a new message rate periodically (e.g., every 100 milliseconds). In another embodiment, the method 608a is implemented by the determination module 307 episodically at irregular intervals. In this way, the message rate can be recursively updated and converge to a steady state message rate at a fixed proportion to that for another vehicle system 103 depending on the ratio between parameters.

FIG. 7B is a flow diagram illustrating a method 608b for determining a message rate by implementing the LIMERIC algorithm. The method 608b starts with the determination module 307 calculating 752 a comparing factor based at least in part on the ratio error and one of the adaptive parameters used in the LIMERIC algorithm. The determination module 307 determines 754 if the comparing factor is larger than the maximum gain. If at step 754 the determination module 307 determines that the comparing factor is larger than the maximum gain, the method 608b proceeds to step 756. At step 756, the determination module 307 updates the ratio error based at least in part on the maximum gain and the one of the adaptive parameters.

If at step 754 the determination module 307 determines that the comparing factor is not larger than the maximum gain, the method 608b proceeds to step 758. At step 758, the determination module 307 determines a message rate based at least in part on the ratio error (updated or not updated depending on the determination made at step 754) and two adaptive parameters used in the LIMERIC algorithm. The calculation equation at either situation has been described in detail with reference to FIG. 3. In one embodiment, the method 608b is implemented by the determination module 307 periodically at certain intervals. For example, the determination module 307 calculates the comparing factor periodically (e.g., every 100 milliseconds) and determines a new message rate periodically (e.g., every 100 milliseconds). In another embodiment, the method 608b is implemented by the determination module 307 episodically at irregular intervals. In this way, the message rate can be recursively updated and converge to a steady state message rate at a fixed proportion to that for another vehicle system 103 depending on the ratio between parameters.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method, comprising:
measuring a channel busy ratio describing a fraction of time during which a channel is busy;
calculating a ratio error by comparing the measured channel busy ratio with a target channel busy ratio;
determining a first parameter value for a first vehicle based at least in part on a ratio of weights; and
determining a message rate for the first vehicle recursively based at least in part on the ratio error and the first parameter value so that the message rate converges to a steady state message rate based at least in part on the ratio of the weights, the message rate describing a speed for transmitting messages from the first vehicle.

2. The method of claim 1, wherein determining the first parameter value for the first vehicle further comprises:
determining a parameter ratio based at least in part on the ratio of weights; and
determining the first parameter value for the first vehicle based at least in part on the parameter ratio.

3. The method of claim 2, wherein the parameter ratio describes a proportion between the first parameter value for the first vehicle and a second parameter value for a second vehicle.

4. The method of claim 2, wherein the parameter ratio equals to the ratio of weights.

5. The method of claim 2, wherein determining of the first parameter value for the first vehicle is further based at least in part on a type of the first vehicle.

6. The method of claim 1, wherein determining the message rate for the first vehicle further comprises:
determining a sign of the ratio error; and
determining the message rate for the first vehicle based at least in part on the sign of the ratio error.

7. A system comprising:
one or more processors;
a measurement module executable by the one or more processors to measure a channel busy ratio describing a fraction of time during which a channel is busy;
a calculation module executable by the one or more processors and communicatively coupled to the measurement module, the calculation module executable to calculate a ratio error by comparing the measured channel busy ratio with a target channel busy ratio; and
a determination module executable by the one or more processors and communicatively coupled to the calculation module, the determination module executable to determine a first parameter value for a first vehicle based at least in part on a ratio of weights and to determine a message rate for the first vehicle recursively based at least in part on the ratio error and the first parameter value so that the message rate converges to a steady state message rate based at least in part on the ratio of the weights, the message rate describing a speed for transmitting messages from the first vehicle.

8. The system of claim 7, wherein determining the first parameter value for the first vehicle further comprises:
determining a parameter ratio based at least in part on the ratio of weights; and
determining the first parameter value for the first vehicle based at least in part on the parameter ratio.

9. The system of claim 8, wherein the parameter ratio describes a proportion between the first parameter value for the first vehicle and a second parameter value for a second vehicle.

10. The system of claim 8, wherein the parameter ratio equals to the ratio of weights.

11. The system of claim 8, wherein determining of the first parameter value for the first vehicle is further based at least in part on a type of the first vehicle.

12. The system of claim 7, wherein determining the message rate for the first vehicle further comprises:
determining a sign of the ratio error; and
determining the message rate for the first vehicle based at least in part on the sign of the ratio error.

13. A computer program product comprising a non-transitory computer readable medium encoding instructions that, in response to execution by a computing device, cause the computing device to perform operations comprising:
measuring a channel busy ratio describing a fraction of time during which a channel is busy;
calculating a ratio error by comparing the measured channel busy ratio with a target channel busy ratio;
determining a first parameter value for a first vehicle based at least in part on a ratio of weights; and
determining a message rate for the first vehicle recursively based at least in part on the ratio error and the first parameter value so that the message rate converges to a steady state message rate based at least in part on the ratio of the weights, the message rate describing a speed for transmitting messages from the first vehicle.

14. The computer program product of claim 13, wherein determining the first parameter value for the first vehicle further comprises:
determining a parameter ratio based at least in part on the ratio of weights; and
determining the first parameter value for the first vehicle based at least in part on the parameter ratio.

15. The computer program product of claim 14, wherein the parameter ratio describes a proportion between the first parameter value for the first vehicle and a second parameter value for a second vehicle.

16. The computer program product of claim 14, wherein the parameter ratio equals to the ratio of weights.

17. The computer program product of claim 14, wherein determining of the first parameter value for the first vehicle is further based at least in part on a type of the first vehicle.

* * * * *